United States Patent [19]

McNeely et al.

[11] Patent Number: 4,890,162
[45] Date of Patent: Dec. 26, 1989

[54] ADJUSTABLE ANTIALIAS FILTERS

[75] Inventors: David L. McNeely, Indianapolis; Russell T. Fling, Noblesville, both of Ind.

[73] Assignee: RCA Licensing Corporation, Princeton, N.J.

[21] Appl. No.: 301,923

[22] Filed: Jan. 26, 1989

[51] Int. Cl.$^4$ .......................... H04N 7/13; H04N 5/272
[52] U.S. Cl. ...................................... 358/138; 358/22; 358/180; 358/183; 364/724.17
[58] Field of Search ................. 358/138, 22, 180, 183; 364/724.17

[56] References Cited

U.S. PATENT DOCUMENTS

| | | | |
|---|---|---|---|
| 4,064,530 | 12/1977 | Kaiser et al. | 358/36 |
| 4,472,733 | 9/1984 | Bolger | 358/38 |
| 4,646,138 | 2/1987 | Willis | 358/36 |
| 4,656,516 | 4/1987 | Fling et al. | 358/183 |
| 4,717,951 | 1/1988 | Fling | 358/22 |
| 4,827,343 | 5/1989 | Naimpally | 358/183 |

Primary Examiner—Howard W. Britton
Attorney, Agent, or Firm—Joseph S. Tripoli; Eric P. Herrmann; James B. Hayes

[57] ABSTRACT

A programmable sampled data subsampling system includes a programmable antialias filter which bandlimits the information bandwidth of the signal to be subsampled in accordance with the subsampling rate. The antialias filter includes a recursive filter which scales and combines input samples and delayed combined samples in proportions of K and (1−K) where K is a variable. The variables K are applied to the recursive filter in repeating sequences of N values of K where N is the subsampling factor. Every $N^{th}$ combined sample is extracted and provided as the subsampled signal.

10 Claims, 5 Drawing Sheets

ADJUSTABLE ANTIALIAS FILTERS

This invention relates to antialias filters having transfer functions which are easily adjusted to conform to a plurality of desired sampling ratio, as for example in video signal feature processors.

BACKGROUND OF THE INVENTION

In digital systems it is frequently necessary to process a signal at different sample rates. For example, a multimode audio processor may be arranged in a first mode to process a single audio signal occurring at a sample rate F, in a second mode to process two audio signals in time division multiplex fashion where each signal is processed at a rate F/2, and n a third mode to process N audio signals in time divisions multiplex fashion where each signal is processed at a rate F/N. Assuming each of the N audio signals occur at a sample rate F and include a spectrum of information including frequencies approaching F/2 (the Nyquest sampling limit), the N audio signals must be filtered to reduce the information spectrum to less than F/2N to prevent aliasing, and then subsampled to a rate F/N before time division multiplexing for application to the processor. The bandwidth of the respective antialias filters must be adjustable in accordance with the number N of signals to be time division multiplexed.

As a further example, consider a television TV receiver having a picture-in-picture processor which can simultaneously display a selectable number of reduced sized images. The processor may display four images each of which is compressed to occupy ¼ of the display screen, nine images each of which is compressed to occupy 1/9 of the display screen, 16 images each of which is compressed to occupy 1/16 of the display screen, etc. Assume that the video signals representing each of the images is sampled to include the full video bandwidth of a non-compressed image. In this instance the picture-in-picture processor will include a selectably adjustable antialias filter or filters to limit the information bandwidth of each of the images in accordance with the selected compression factor.

Programmable digital low pass filters for adjusting the information passband of signals in digital format are known. Typically these filters take the form of output weighted finite impulse response filters with provision for changing the weighting factors. However, such filters tend to become relatively complicated if the filter is to accommodate even a relatively narrow range of different bandwidths.

It is also known to form programmable low pass filters as infinite impulse response or recursive filters. These filters also include weighting elements which are selectably programmable to define the signal passband.

Nominally, in both of the foregoing types of filters, a fixed set of weighting coefficients are applied to the weighting elements to define a particular passband. Fling et al. in U.S. Pat. No. 4,656,516 describe, with reference to FIG. 3A therein, a fixed bandwidth recursive type antialias filter which employs a reciprocating sequence of weighting coefficients. The Fling et al. filter forms a pseudoaverage of mutually exclusive groups of N samples wherein each of the samples in each group is weighted by a different coefficient. This filter is particularly advantageous in that it requires only one weighting element and therefore is very parts efficient.

It is an object of the present invention to provide a variable bandwidth filter embodied in a subsampling system which (a) employs a recursive filter arrangement; (b) utilizes reciprocating sets of weighting coefficients; and (c) is simply programmable using for example the reciprocal of the desired subsampling ratio.

SUMMARY OF THE INVENTION

The present invention includes the series connection of a scaling/combining element and a delay element. Circuitry including a sequencer applies reciprocating sets of weighting coefficients to the scaling/combining means to combine input signal and delayed signal from the scaling/combining means in complementary proportions. In one example of the invention a sampler is coupled to the delay element and is responsive to the sequencer for outputting every $N^{th}$ combined sample. The sequencer includes an input terminal for applying a value related to the subsampling ratio for programming the frequency passband of the output signal processed by the scaling/combining element.

DETAILED DESCRIPTION

The invention may be practiced in either the digital (binary) or sampled data analog domain with appropriate selection of circuit elements. In the digital domain the invention may be practiced in either bit-serial or parallel bit format. The following description will however be in terms of parallel bit processing. As such where applicable the interconnections are assumed to be parallel conductor busses. In the Figures compensating delay elements may be required in certain signal paths to effect temporal alignment of corresponding signals, due to inherent processing delays that may be present in particular circuit elements implemented. One skilled in the art of digital circuit design will readily recognize where such compensating delays may be required.

Figure 1:
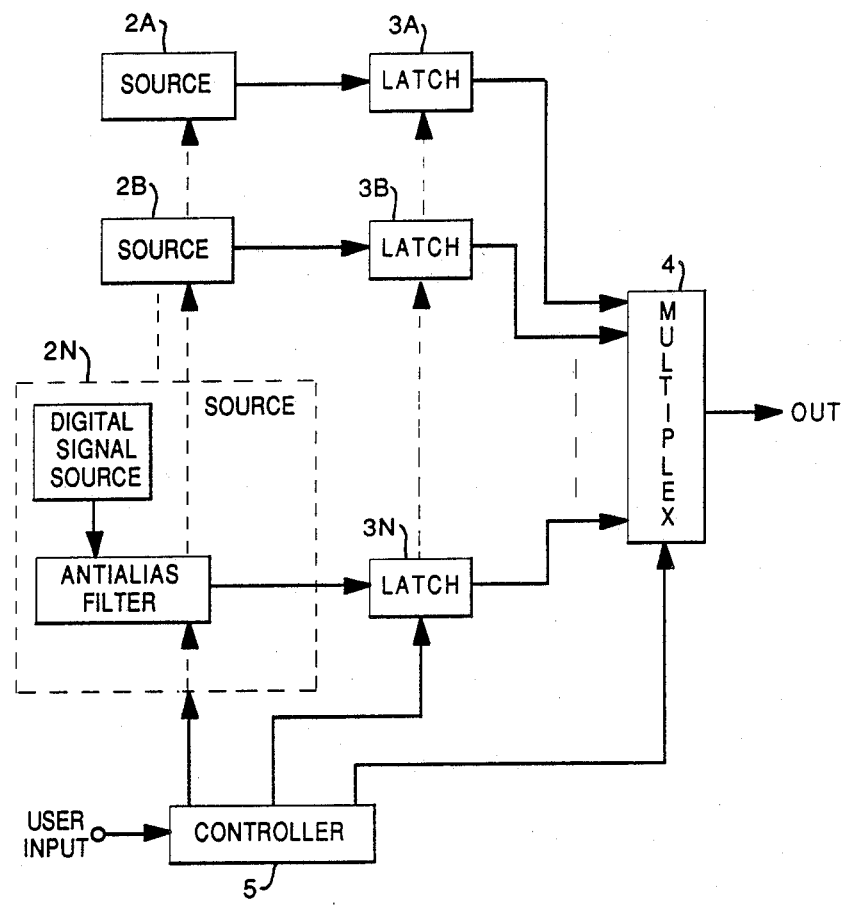
FIG. 1 is a block diagram of a digital system for selectably multiplexing a plurality of digital signals, which system incorporates antialiasing filters embodying the present invention.

Referring to FIG. 1, a system for selectably multiplexing a plurality of signals is shown. In this system it is assumed that the signal bandwidth of each of the respective signals comports with the maximum bandwidth that the channel OUT can accommodate. Thus if the multiplexer 4 provides a digital signal from only one of the available sources, the output signal will have the maximum available bandwidth. Alternatively, if the multiplexer 4 is conditioned to time division multiplex a plurality N of the available digital signals in sample interleaved fashion, the bandwidth of the respective multiplexed signals will be reduced by the factor N, by the sampling action of the multiplexer in accordance with the Nyquest sampling criterion. To preclude inclusion of frequency foldover or aliasing components, in the respective multiplexed output signals, the respective input signals applied to the multiplexer 4 must be band limited to at least one half the reciprocal of the multiplexing rate.

In FIG. 1 a plurality of digital signal sources 2A-2N are provided. The respective signals may represent for example the components of a quadraphonic sound system including a monaural component, a stereo (L-R) component and the requisite additional components. The channel OUT may be a transmission channel. Depending upon whether it is desired to transmit, a monaural, a stereo or a quadraphonic signal the multiplexer 4 will be conditioned to time division multiples 1, 2 or N of the signals.

Each of the signal sources 2A-2N are configured similar to the element 2N, including a source of wideband digital signals coupled in cascade with an antialiasing filter. The antialiasing filters are responsive to a control signal provided by the controller 5. The control signal represents the degree of multiplexing and conditions the filters to appropriately bandlimit the information provided by the respective digital sources. The respective filtered signals from sources 2A-2N are coupled to respective latches 3A-3N which store the respective filtered samples for a multiplexing cycle and provide the filtered signals to respective input connections of the multiplexer 4. The latches 3A-3N and the multiplexer 4 are operated under the control of the controller 5. Details of the antialiasing filters will be provided hereinafter with reference to FIG. 3.

Figure 2:
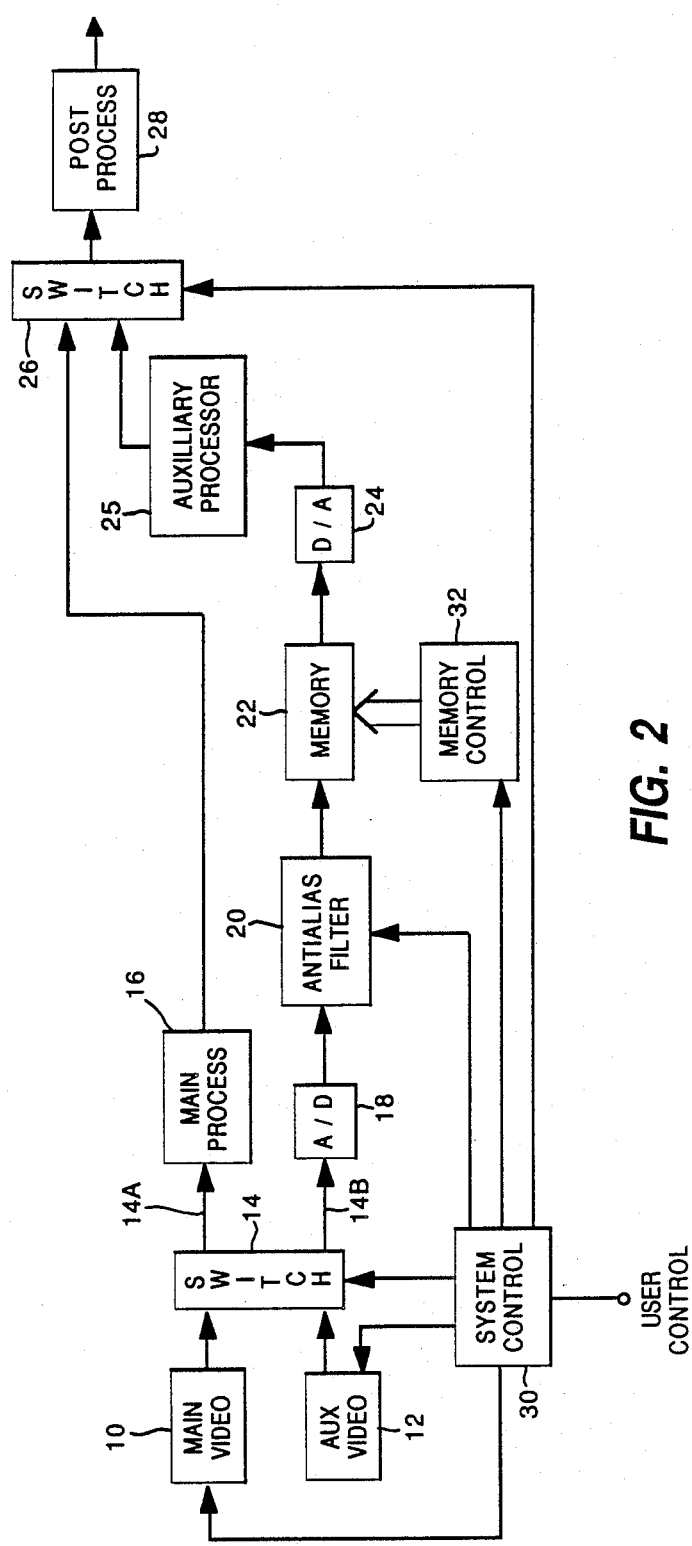
FIG. 2 is a block diagram of a portion of a video system for generating a video signal having selectable signal bandwidth including a filter embodying the present invention.

Referring to FIG. 2, a picture-in-picture (PIP) video processor utilizing an antialiasing filter embodying the invention is illustrated. A PIP video processor of this type may be included in for example a television receiver (TV) or a video cassette recorder (VCR). In FIG. 2 main video signals and auxiliary video signals are provided by video signal sources 10 and 12 respectively. Sources 10 and 12 may be conventional tuners and intermediate frequency circuits which provide baseband video signals. The main and auxiliary video signals are coupled to respective input terminals of a switching arrangement 14, which is conditioned by the system user, via system controller 30, to apply the desired video signals to its output terminals 14A and 14B. The video signal applied to output terminal 14A is coupled to a main video processor 16 which may include video signal processing circuits of the type utilized in a conventional TV receiver. The processed video signals from processor 16 are coupled to one input port of a further switching arrangement 26. Output signals from the switching arrangement 26 are coupled to a post processing circuit 28. If the circuitry of FIG. 2 is incorporated in a TV receiver the post processing circuit 28 may include driver circuits for conditioning the video signal for application to a kinescope display device. Alternatively if the circuitry of FIG. 2 is incorporated in a VCR, the post processing circuit 28 may include an r.f. modulator for providing a VHF signal.

The video signal applied to output terminal 14B, of the switching arrangement 14, is coupled to an analog-to-digital converter (A/D) 18 which converts the analog video signal to a binary sampled data signal representing the analog signal.

The binary signal provided by A/D 18 is coupled to an antialias filter 20 of the type embodied by the invention. Antialias filter 20 is responsive to control signals from the controller 30 to appropriately adjust the passband of the information content of the binary video signal according to the function performed by the system.

Samples from the antialias filter 20 are coupled to a memory element 22 which may have sufficient storage capacity to store one or more frames of video signal. The format in which the binary signal is stored in memory element 22 is controlled by the memory controller 32 under direction from the system controller 30. Memory controller 32 will include memory write and read address generating circuitry.

Stored binary video signal from memory element 22 is converted back to analog form by the digital-to-analog converter (D/A) 24. The analog signal from D/A 24 is applied to an auxiliary signal processor 25 which may include circuitry for brightness and contrast control, matrixing, etc. Processed signal from the auxiliary processor 25 is coupled to a second input terminal of the switch arrangement 26. 20 The switch arrangement 26 is controlled by the system controller 30 to provide various combinations of output signals to the post processor 28. In a fist mode switch arrangement 26 is conditioned to provide signal from only the main processor 16. In this mode the output signal is similar to a video signal as provided by a conventional TV receiver.

In a second mode the switch arrangement 26 may be conditioned to time division multiplex the signals from both the main and auxiliary processors in a known sequence to provide a signal conforming to a picture-in-picture video signal. In a third mode the switch arrangement 26 may be conditioned to provide output signal from the auxiliary processor 25 only. In this mode a variety of image formats may be generated, according to the operation of the memory controller. For example, full resolution still images, multipicture images, zoomed images, etc., may be provided. Circuitry for generating such features, that is the configuration and/or operation of the memory controller, is known in the video signal processing arts, and therefore details will not be provided herein. Suffice it to say however that for the multipicture function wherein a number of different images are composed for simultaneously display in exclusive portions of the reproduced image, the binary video signals representing the different images must be subsampled before effecting the composition. In contrast, to effect the still image feature, it is desirable to sample the binary video signal with full resolution that is to sample the full image without subsampling. Hence the need for a programmable antialias filter in the system to control the bandwidth of the video signal depending upon the image feature being implemented.

Typically currently available video apparatus which provide the above choice of features include an antialias filter or filters located before the A/D converter. These systems may include provision for bypassing the filter when full band signals are output. In these systems the antialias filters have a fixed passband and generally provide compromised performance of at least some of the features. The current arrangement, including a programmable antialias filter overcomes this shortcoming.

Nominally, in systems exemplified by the FIG. 2 apparatus, the main and auxiliary video sources 10 and 12 provide composite video signals. In this instance the main video processor 16 and the auxiliary video processor 24 may be arranged to provide separated luminance and chrominance signal components to the switch arrangement 26. In addition circuitry may be included either immediately before or after the A/D 18 to separate the luminance and chrominance components of the composite signal processed thereby. The luminance and chrominance components will be coupled to separate antialias filters arranged to accommodate the different bandwidths of the component signals. The filtered output signals from the separate antialias filters may be combined in known fashion for application to a single memory element, or applied to separate memory elements.

Other arrangements are contemplated wherein the chrominance component may be demodulated into its baseband color difference components. In this instance, due to the significantly low bandwidth of the baseband color difference components relative to the luminance signal, it may only be necessary to antialias filter the luminance component.

The foregoing discussion should not be interpreted to indicate that composite video signal may not be directly antialias filtered in the exemplary apparatus of FIG. 2.

One further note, the antialias filter 20 may include provision for both vertical and horizontal filtering. Alternatively one or the other of these functions may be performed by a fixed bandwidth antialias filter positioned ahead of the A/D 18.

Figure 3:
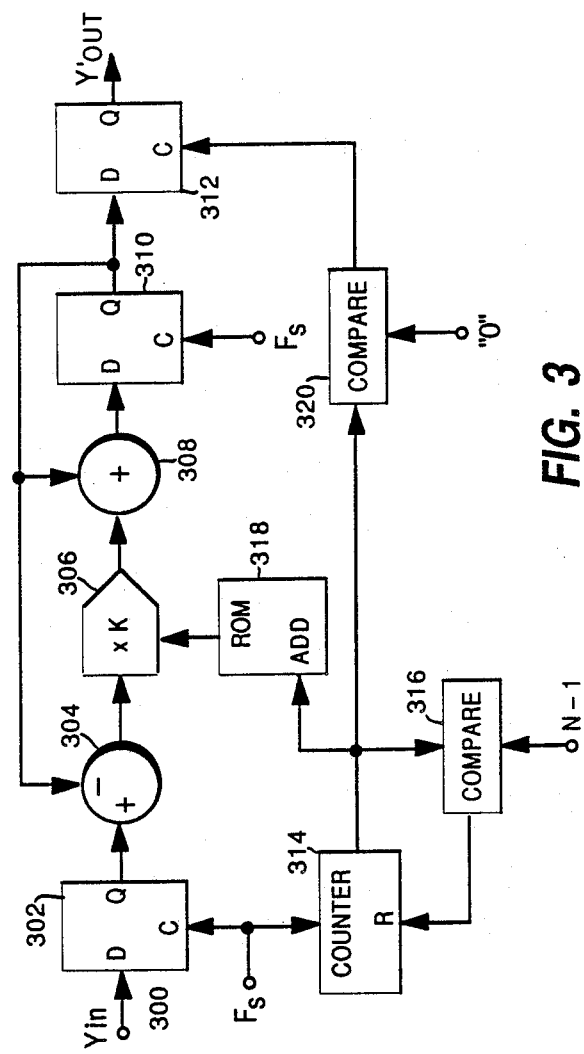
FIGS. 3, 4 and 5 are alternative arrangements of filters having selectable passbands, embodying the present invention.

FIG. 3 illustrates one embodiment of a programmable sampled data antialias filter which is conducive to band limiting horizontal video information. The system of FIG. 3 operates synchronously with the applied input samples, under the control of a clock signal $F_s$ having a frequency, $f_s$, equal to the sample rate. In FIG. 3 input samples Yin (which may be luminance signal samples) are coupled to the data input terminal 300 of a D-type latch 302. Successive input samples are stored into latch 302 under the control of the clock signal $F_s$. Successive input samples from latch 302 are applied to the minuend input terminal of a subtractive combing circuit 304. Output differences from combining circuit 304 are coupled to a variable scaling circuit 306. Scale factors, K, are applied to the scaling circuit 306 from logic circuitry 318, illustrated as a read only memory (ROM). Scaled samples from circuit 306 are coupled to one input terminal of an additive combining circuit 308. Sums generated by combining circuit 308 are applied to the data input terminal of a D-type latch 310. The sums are loaded into latch 310 under the control of the clock signal $F_s$. Relative to the input samples applied to combining circuit 304, latch 310 provides sums delayed by one sample period. The delayed sums from latch 310 are coupled to second input terminals of the combining circuits 304 and 308. If the input samples are designated $S_I$ and the delayed sums are designated $S_D$, the sums S provided by combining circuit 308 are given by:

$$S = KS_I + (1-K)S_D \quad (1)$$

As such the circuit elements 304–310 form a recursive filter. It can be shown however, that with a judicious choice of sequences of "K" factors the system will generate average values over each sequence and that the bandwidth of the averaged values is directly related to the number of samples in the sequence. For example, consider one sample per sequence and a K factor of 1. Each output sample is equal to the input sample and the signal retains its full bandwidth. Next consider two samples per sequence with reciprocating K factors of 1 and ½. Every second output sample will be formed of half values of the two previous samples. The information bandwidth will be approximately reduced to ½ of the original maximum signal bandwidth due to the averaging process, that is frequencies about $f_s/4$ are substantially attenuated.

It can be shown that if the first K factor is equal to 1 and each successive K factor $K_n$ is set equal to $$K_n = K_{n-1}/(1 + K_{n-1}) \quad (2)$$

the sum over n samples scaled by factors $K_n$ and $(1-K_n)$ will be equal to the sum of $1/n^{th}$ each input sample, or the average of n successive samples. Note however that the intermediate output samples are not usable and only the $n^{th}$ output value for a sequence of n is useable.

Table I shows possible k values for sequences of 1 to 8 corresponding to bandwidth reduction factors of 1 to 8, i.e., substantial attenuation of signal frequencies above $f_s/2$ to $f_s/16$. The first row of K values K(A) produce exact results for the sequence terminated at any value.

It will be appreciated by those skilled in the art of digital circuit design that circuitry to scale samples by other than reciprocal powers of two is relatively complex. The second set of K factors K(B) in Table I provides a close approximation to averages over n samples. Scaling by these factors can be accomplished by relatively simple shift-and-add scaling circuitry. The third set of K factors K(C) also provide acceptable approximations of averages over n samples. Each of these K factors is a reciprocal power of two and as such permit scaling of samples by simple bit shifting and truncation.

TABLE 1

| Sequence # | 1 | 2 | 3 | 4 | 5 | 6 | 7 | 8 |
|---|---|---|---|---|---|---|---|---|
| K value (A) | 1 | ½ | ⅓ | ¼ | 1/5 | 1/6 | 1/7 | 1/8 |
| K value (B) | 1 | ½ | 21/64 | ¼ | 13/64 | 11/64 | 9/64 | 1/8 |
| K value (C) | 1 | ½ | ¼ | ¼ | ⅛ | ⅛ | ⅛ | ⅛ |

Table II illustrates several examples of K value sequencing with respect to input and output samples and therefore several subsample rates. The particular K values used in Table II were selected from row (K(c) of Table I.

In the left hand column the number in parenthesis adjacent the letter K indicates the number of K values in a sequence. The rows designated O(i) indicate output samples subsampled by the factor i. The output values O(i) are aligned with the input sample for which the output sample is valid.

TABLE II

| Input Sample# | 1 | 2 | 3 | 4 | 5 | 6 | 7 | 8 | 9 | 10 | 11 | 12 | 13 |
|---|---|---|---|---|---|---|---|---|---|---|---|---|---|
| K(2) | 1 | ½ | 1 | ½ | 1 | ½ | 1 | ½ | 1 | ½ | 1 | ½ | 1 |
| O(2) |  | 01 |  | 02 |  | 03 |  | 04 |  | 05 |  | 06 |  |
| K(3) | 1 | ½ | ¼ | 1 | ½ | ¼ | 1 | ½ | ¼ | 1 | ½ | ¼ | 1 |
| O(3) |  |  | 01 |  |  | 02 |  |  | 03 |  |  | 04 |  |
| K(6) | 1 | ½ | ¼ | ¼ | ⅛ | ⅛ | 1 | ½ | ¼ | ¼ | ⅛ | ⅛ | ⅛ |
| O(6) |  |  |  |  |  | 01 |  |  |  |  |  |  | 02 |

Since only the $n^{th}$ output sample of every n sample sequence is valid, selection of the valid samples produces a subsampled signal which has been lowpass filtered to preclude aliasing.

In FIG. 3 the K factors are provided to scaling circuit 306 via the ROM 318. The ROM 318 is programmed at consecutive address locations with K factors representing the longest sequence (i.e., greatest subsample factor)

to be implemented by the system. An up counter 314, is arranged to count the clock signal $F_s$ modulo n, and the counted values are coupled as address codes to the ROM 318. The counter 314 is conditioned to count modulo n by virtue of the comparator 316. Comparator 316 is arranged to compare the count values from counter 314 with a value n-1 where n is the desired modulus. Note, the reference value n-1 is used rather than n because it is assumed that the counter provides an initial count value of zero. Other known modulo n counters may be utilized.

Output samples are derived from the FIG. 3 apparatus from the D-type latch 312 and not from combining circuit 308. The signal available to latch 312 is the signal from combining circuit 308 delayed by one sample period. Every $n^{th}$ sample provided by combining circuit 308 is latched into the D-type latch 312 under the control of a comparator 320 which generates clock pulse each time the counter 314 initiates a new counting sequence.

Both the subsample rate and the information bandwidth are simultaneously established by applying the single reference value which controls the counter modulus.

Figure 4:
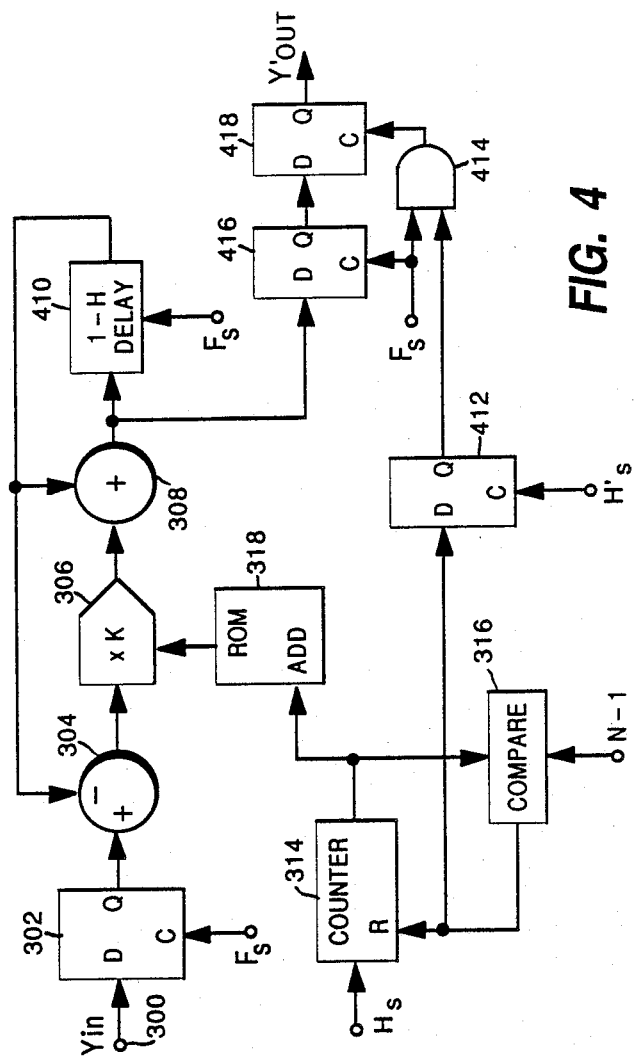

The circuitry illustrated in FIG. 4 is an antialias filter subsample system which is arranged to perform subsampling of a video signal, e.g., luminance signal, in the vertical direction. In FIG. 4, circuit elements having the same designating numerals as elements in FIG. 3 are similar and perform like functions. The apparatus of FIG. 4, however, produces a horizontal line of video samples (at the input sample rate) for every n horizontal line of applied signal. In FIG. 4 a delay element, 410, for delaying samples by one horizontal line period is substituted for the latch 310. Delay element 410 receives and produces samples at the input sample rate ($f_s$).

Output samples $Y'_{out}$ are derived directly from the combining means 308 via the cascade connection of D-type latches 416 and 418. Latch 416 is clocked by the input sample rate clock $F_s$ to provide all computed sample values to the latch 418. Latch 418 is clocked by the input sample rate clock every $n^{th}$ line to provide the antialias filtered vertically subsampled output signal $Y'_{out}$.

In FIG. 4 the counter 314 is arranged to count horizontal synchronizing pulses $H_s$ which occur at the beginning of each horizontal line interval. When each $n^{th}$ horizontal pulse occurs comparator 316 produces a logic one valued output signal which is coupled to the reset input terminal of counter 314 and the data input of D-type latch 412. On the next subsequent occurrence of a horizontal synchronizing pulse the logic one valued signal applied to the counter reset terminal causes the counter to reset to zero, thereby initiating another counting sequence.

The logic one valued output signal from comparator 316 is loaded into latch 412 by the signal $H'_s$ during the line interval it is generated, i.e., every $n^{th}$ line interval. Signal $H'_s$ may be a delayed version of the horizontal synchronizing signal generated by, for example, delaying the horizontal synchronizing signal by one sample period, or a time long enough to insure that the comparator 316 output signal has changed state following the occurrence of the horizontal synchronizing pulse.

The latch 412 provides a logic one valued output signal every $n^{th}$ horizontal line period and a logic zero valued output signal during all intervening line periods.

The input sample rate clock signal $F_s$ and the output signal from latch 412 are coupled to respective input terminals of a gate circuit 414. The gate circuit 414 is conditioned by the signal from latch 412 to provide the clock signal $F_s$ during every $n^{th}$ horizontal line period. The gated clock signal $F_s$ is applied to latch 418, to condition latch 418 to provide the vertically subsampled signal.

Note, for example, with regard to vertical filtering, if the desired output signal is to reflect an interlaced video signal, it may be desirable to select different horizontal lines as the first horizontal line to be processed in alternate fields to either preserve or produce an interlaced signal. This may be accomplished by simply selecting the appropriate horizontal synchronizing pulse $H_s$ as the first pulse to be applied to the modulo counter 314. Similarly, regarding horizontal filtering, if the clock frequency is an even or odd multiple of the chrominance subcarrier frequency, it may be desirable, for example, to select different first clock pulses on alternate lines or fields to maintain vertical alignment of the processed output sample.

The circuit of FIGS. 3 and 4 may be connected in cascade to provide both horizontal and vertical subsampling of a video signal. In this instance if the signal is to be subsampled in a ratio of 1:n in both the horizontal and vertical directions and the input to the circuitry of FIG. 4 is coupled to the output of the circuitry of FIG. 3, the frequency of the clock signal applied to circuit elements of FIG. 4 will be equal to the frequency of the clock signal $F_s$ applied to the circuit elements of FIG. 3 divided by n. Coupling the filters in this order reduces the number of delay stages required in delay element 410. Alternatively, if the FIG. 4 circuit is coupled ahead of the FIG. 3 circuit delay element 410 must include sufficient stages to hold an entire line of samples. Also the frequency of the clock signal $F_s$ must be the same for both circuits.

Figure 5:
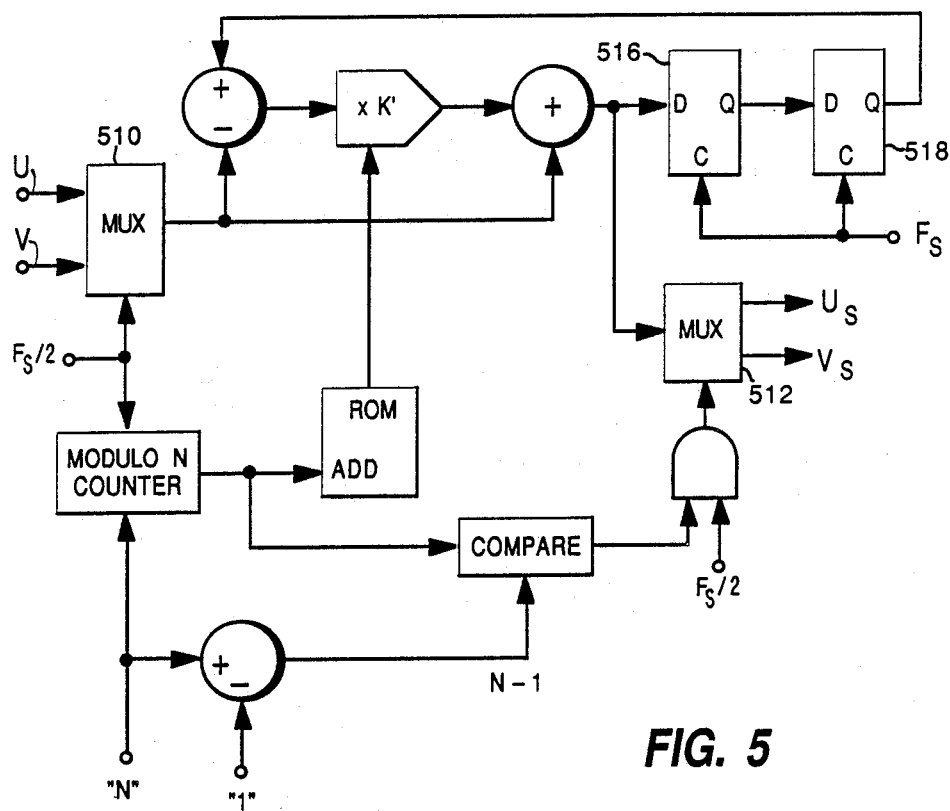

The apparatus of FIG. 5 is a simple variation on the circuitry of FIGS. 3 and 4 and operates in similar fashion and on the same principles. In FIG. 5 the sequence of scale factors $K'$ applied to the scaling circuit correspond to the factors $(1-K)$ applied to the scaling circuits of FIGS. 3 and 4. In addition the FIG. 5 circuitry is arranged to filter two signals each having a sample rate of $F_s/2$. The two signals U and V are time interleaved in the two-to-one multiplexer 510 and sequentially applied to the filter circuit. Respective sums for the two signals remain distinct by virtue of the two latches 516 and 518 in the feedback loop. The two latches are clocked at twice the input sample rate, i.e., at two times $F_s/2$. Respective subsampled signals $U_s$ and $V_s$ are separated by the multiplexer 512 which is gated to select the processed samples during application of the $n^{th}$ $K'$ factor.

What is claimed is:
1. Apparatus for filtering a signal, comprising:
   a signal input terminal for providing a sampled data signal, samples of said sampled data signal occurring at a rate $F_s$;
   scaling and combining means for combining two signals in proportions of K and $(1-K)$ respectively (K a variable), having a first input terminal coupled to said signal input terminal having a second input terminal, an output terminal for providing filtered signal, and a control terminal for applying values representing said variable K;

delay means having input and output terminals respectively coupled to the output and second input terminals of said scaling and combining means;

means for programmably providing to said control terminal repeating sequences of said values representing said variable K, the number of values in each sequence determining the bandwidth of said filtered signal, and successive values in each sequence representing decreasing values of K.

2. The apparatus set forth in claim 1 wherein said means for programmably providing repeating sequences, comprises:

means for applying a clock signal representing occurrences of input samples;

programmable counting means for counting pulses of said clock signal modulo N (N an integer less than or equal to a second integer M) and providing successive output count values representing consecutive pulses of a sequence of N pulses;

logic means for providing M predetermined values representing said variable K, each of said M predetermined values being associated with a different one of M count values, said logic means being coupled to said counting means and being responsive to said N successive output count values for generating sequences of N predetermined values representing the variable K.

3. The apparatus set forth in claim 1 further including means coupled to said scaling and combining means for providing as filtered output signal, samples provided by said scaling and combining means occurring during application of the last value of each sequence of values representing said variable K.

4. Apparatus for subsampling input sampled data signals occurring at a rate $f_s$ to samples occurring at a rate $f_s/N$ (N a variable), comprising:

a signal input terminal for applying said input sampled data signal;

scaling/combining means having a first input terminal coupled to said signal input terminal, having a second input terminal, an output terminal for providing filtered samples, a control terminal for applying control values representing a scaling factor K (K a variable), for scaling and combining samples applied to said first and second input terminals in proportions K and $(1-K)$;

delay means having input and output terminals respectively coupled to the output and second input terminals of said scaling/combining means, for delaying samples by a period equal to $1/f_s$;

means for applying a clock signal having a pulse rate of $f_s$;

programmable counting means, responsive to said clock signal for counting modulo N (N an integer) pulses of said clock signal and providing count values representing successive ones of said pulses, and having a program input terminal for applying a program value to determine the counting modulus N;

logic means, coupled to said programmable counting means, for generating predetermined control values representing the variable K, each of said predetermined control values associated with a respective count value, said logic means having capacity for providing M predetermined control values ones of which differ from each other, (M an integer greater than or equal to N);

means for applying said control values to said control terminal; and means coupled to said scaling/combining means for providing combined samples generated by the scaling/combining means during the occurrences of every $N^{th}$ control value.

5. The apparatus set forth in claim 4 wherein said input sampled data signal is a video signal and said delay element provides a delay period of one sample period and said means for providing samples from said scaling/combining means provides every $N^{th}$ sample.

6. The apparatus set forth in claim 4 wherein said input sampled data signal is a video signal and the delay element provides a delay period of one horizontal line interval, and said means for providing samples from said scaling/combining means provides samples from every $N^{th}$ horizontal line interval.

7. The apparatus set forth in claim 4 wherein said logic means comprises a read only memory having an address input terminal coupled to said programmable counting means, an output terminal coupled to said control terminal, and having successive address locations programmed with said predetermined control values.

8. The apparatus set forth in claim 4 wherein M is equal to eight and said control values associated with said successive address locations respectively represent K variables of $1, \frac{1}{2}, \frac{1}{3}, \frac{1}{4}, \frac{1}{5}, \frac{1}{6}, \frac{1}{7}, \frac{1}{8}$.

9. A subsampling system comprising:

a signal input terminal for applying sampled data signals occurring at a rate $f_s$;

a recursive filter, having an input terminal coupled to said signal input terminal, having an output terminal and a control terminal for applying control values representing scale factors K (K a variable), said recursive filter combining input signals and filtered signal provided thereby in proportions K and $(1-K)$ respectively;

programmable means coupled to said control terminal for providing repeating sequences of N control values (N an integer), said control values occurring at the rate $f_s$ and successive control values representing decreasing values of the variable K, said programmable means having a program input terminal for applying a program value to determine the number N of control values in a sequence; and means coupled to said recursive filter for providing as a subsampled output signal every $N^{th}$ filtered sample.

10. The system set forth in claim 9 wherein said sampled data signals represent a video signal and said rate $f_s$ corresponds to the horizontal line rate of the video signal and wherein the means coupled to said recursive filter provides as a subsampled output signal, samples from every $N^{th}$ horizontal line interval (every $N^{th}$ vertically aligned sample).

* * * * *